US008669300B2

(12) United States Patent
Eisele et al.

(10) Patent No.: US 8,669,300 B2
(45) Date of Patent: Mar. 11, 2014

(54) MODIFIED POLYURETHANE ACRYLATE

(75) Inventors: Gilles Eisele, Fillinges (FR); Thierry Marsille, Saint Pierre en Faucigny (FR); Gilles Catherin, Saint Genis Pouilly (FR)

(73) Assignee: Siegwerk Druckfarben AG & Co. KGaA, Siegburg (DE)

( * ) Notice: Subject to any disclaimer, the term of this patent is extended or adjusted under 35 U.S.C. 154(b) by 565 days.

(21) Appl. No.: 12/934,440

(22) PCT Filed: Mar. 19, 2009

(86) PCT No.: PCT/EP2009/053260
§ 371 (c)(1),
(2), (4) Date: Sep. 24, 2010

(87) PCT Pub. No.: WO2009/118270
PCT Pub. Date: Oct. 1, 2009

(65) Prior Publication Data
US 2011/0039971 A1 Feb. 17, 2011

(30) Foreign Application Priority Data

Mar. 25, 2008 (EP) .................... 08102867

(51) Int. Cl.
*C08F 2/46* (2006.01)
*C08G 61/12* (2006.01)
*C08G 18/77* (2006.01)
*C08G 18/10* (2006.01)
*C08G 18/08* (2006.01)

(52) U.S. Cl.
USPC ............... 522/167; 528/73; 528/75; 524/589; 524/590

(58) Field of Classification Search
USPC ................ 522/167; 528/73, 75; 524/589, 590
See application file for complete search history.

(56) References Cited

U.S. PATENT DOCUMENTS

| 5,098,947 | A | * | 3/1992 | Metzger et al. ............... 524/507 |
| 5,703,141 | A | | 12/1997 | Jin |
| 6,465,539 | B1 | | 10/2002 | Weikard et al. |
| 2005/0154076 | A1 | | 7/2005 | Bach et al. |
| 2006/0173122 | A1 | | 8/2006 | Flosbach et al. |

FOREIGN PATENT DOCUMENTS

| DE | 19814874 | 10/1999 |
| EP | 0553702 | 8/1993 |
| EP | 1375614 | 1/2004 |
| EP | 1790673 | 5/2007 |
| GB | 2280905 | 2/1995 |
| WO | 2005/118689 | 12/2005 |
| WO | 2006/085937 | 8/2006 |

OTHER PUBLICATIONS

Ishihama et al., machine English translation of JP 2004-352851, pub. Dec. 2004.*

* cited by examiner

*Primary Examiner* — Michael Pepitone
*Assistant Examiner* — Jessica Roswell
(74) *Attorney, Agent, or Firm* — Shoemaker and Mattare

(57) ABSTRACT

The present invention is related to a radiation curable binder, comprising the reaction product of a polyisocyanate having 3 free isocyanate moieties with an acrylate having isocyanate-reactive groups and a component selected from the group consisting of a $C_{12}$-$C_{22}$ carboxylic acid having one isocyanate-reactive group or a $C_{12}$-$C_{22}$ fatty alcohol. The present invention is furthermore related to a radiation curable printing ink, comprising said binder, at least one diluent, at least one pigment, and optionally additives, as well as to a process of preparing said radiation curable binder. Said binder or said printing ink can be used in offset printing or letterpress printing.

4 Claims, No Drawings

MODIFIED POLYURETHANE ACRYLATE

The present invention is related to a radiation curable printing ink exhibiting improved pigment wetting, adhesion and gelification properties.

In recent years, radiation curable inks have become increasingly popular. Radiation curable inks are inks which can be cured almost instantly when exposed to e.g. electromagnetic radiation in the ultraviolet region. Alternatively, curing of said inks can also be performed using electron beams. It is the rapid curing of these inks which make them attractive for various applications.

Curing of radiation curable inks predominantly proceeds via a radical polymerisation mechanism. Thus, the binder material of radiation curable inks must comprise functional groups which are capable of undergoing such a radical curing mechanism. Typically, these functional groups are unsaturated moieties such as carbon-carbon double bonds, most commonly in the form of acrylate moieties. In UV curing inks, a photoinitiator has to be present in order to evoke the radical polymerisation. In electron beam curing inks, this is not necessary since the electrons themselves act as radical starters. Therefore, a typical radiation curable ink comprises an acrylate containing material as a binder component and optionally a photoinitiator.

Polyurethane acrylates (PU acrylates) have been described as binder components of radiation curable printing inks (see e.g. WO 2006/085937; EP-0 553 702 A1; U.S. Pat. No. 5,703, 141, GB-2,280,905; U.S. Pat. No. 6,465,539). PU acrylates show a better adhesion and greater flexibility than e.g. the cheaper epoxy acrylates. They provide an increased toughness and chemical resistance as compared to other types of acrylates.

Radiation curable printing inks can be applied by a variety of printing processes. The present invention is related to offset and letterpress printing.

Radiation curable printing inks on the basis of acrylate resins suffer from the problem of not particularly good pigment wetting: The pigments and the acrylate resins do not form a good phase-boundary, resulting in problems in obtaining a full print with good adhesion as well as in problems of ink stability. Chalking or pinholes may occur. Especially, a bad gloss of the print is the consequence.

In offset printing, it is necessary to use inks having a pasty consistency. This can be achieved, for example, by a controlled gelification of the ink vehicle. With conventional radiation curable binders, a controlled gelification is not easy to achieve.

It was therefore the problem underlying the present invention to provide a radiation curable ink exhibiting improved pigment wetting and gelification characteristics.

This problem has been solved according to the present invention by a radiation-curable binder as defined in the independent claims and a radiation-curable printing ink comprising said binder.

Specifically, the present invention is related to a radiation curable binder which comprises the reaction product of a polyisocyanate having 3 functional isocyanate moieties (herein-after also referred to as trifunctional isocyanate) with an acrylate having isocyanate-reactive groups and a component selected from the group consisting of a $C_{12}$-$C_{22}$ carboxylic acid having one isocyanate-reactive group or a $C_{12}$-$C_{22}$ fatty alcohol.

According to the present invention, the term "carboxylic acid having one isocyanate-reactive group only covers compounds where in addition to the carboxylic group only one isocyanate-reactive group is present.

As already described above, polyurethane acrylates are well-known. They are conveniently manufactured by reacting an acrylate compound which comprises at least one isocyanate-reactive functional group and a polyisocyanate. For example, the acrylate compound may be a hydroxy-functional acrylate. Reaction between the isocyanate-reactive group of said acrylate, i.e. the hydroxy group, and an isocyanate group of the polyisocyanate results in the formation of a urethane linkage between these moieties.

It has now been the surprising finding of the present invention that if not all free isocyanate groups of a polyisocyanate are reacted with an acrylate having isocyanate-reactive groups, but if at least one of said isocyanate groups is reacted with a component selected from the group consisting of a $C_{12}$-$C_{22}$ carboxylic acid having one isocyanate-reactive group or a $C_{12}$-$C_{22}$ fatty alcohol, preferably with a hydroxy-functional carboxylic acid, then a polyurethane product is obtained which as a binder provides improved pigment wetting and gelling characteristics to a printing ink.

According to the present invention, the polyisocyanate component to be used for the preparation of the binder is a trifunctional isocyanate, allowing the attachment of three components having isocyanate-reactive moieties to said polyisocyanate.

Said trifunctional isocyanate may be formed, for example, from substantially any organic diisocyanate monomer. Aromatic, araliphatic, aliphatic or cycloaliphatic diisocyanates and mixtures of such isocyanates may be used. Preferred are diisocyanates of the formula $X(NCO)_2$, wherein X represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 20 carbon atoms. Specific examples of suitable isocyanates include xylylene diisocyanate, tetramethylene diisocyanate, 1,12-diisocyanatododecane, hexamethylene diisocyanate, 2,3,3-trimethylhexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexane (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, $\alpha,\alpha,\alpha',\alpha'$-tetramethyl-m- or -p-xylylene diisocyanate, as well as mixtures thereof. Hexamethylene diisocyanate, 4,4'-dicyclohexylmethane diisocyanate and isophorone diisocyanate and the mixtures thereof are the preferred isocyanates. Polyisocyanate adducts containing isocyanurate, iminooxadiazine dione, urethane, biuret, allophanate, uretidione and/or carbodiimide groups are also useful as precursor component.

From these monomer precursors, the desired trifunctional isocyanates may be obtained by a trimerization reaction under formation of e.g. an isocyanurate or iminooxadiazine moiety, wherein isocyanurates are preferred. Particularly preferred is the isocyanurate of hexamethylene diisocyanate, which may be prepared in accordance with U.S. Pat. No. 4,324,879:

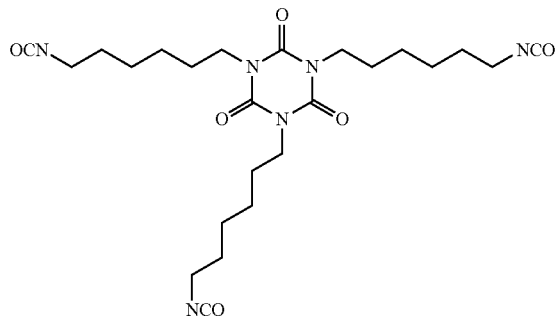

Iminooxadiazine diones can be prepared according to the process described in U.S. Pat. No. 5,914,383. As an example of an Iminooxadiazine dione, the respective trimer obtained from hexamethylene diisocyanate may be shown:

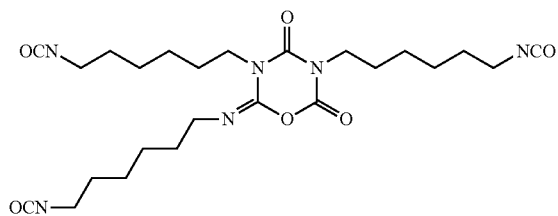

Also suitable are monomeric triisocyanates such as 4-isocyanatomethyl-1,8-octamethylene diisocyanate and triphenylmethane 4,4',4''-triisocyanate.

According to the present invention, preferred trifunctional isocyanate compounds are the following commercially available materials: Tolonate HDT-LV, Tolonate HDT-LV2, Tolonate HDB-LV (all from Rhodia), Desmodur XP 2410, Desmodur N3600 or Desmodur N3200 (all from Bayer).

Also, the biuret of HDI (OCN—$(CH_2)_6$—N(CONH$(CH_2)_6$NCO)$_2$)

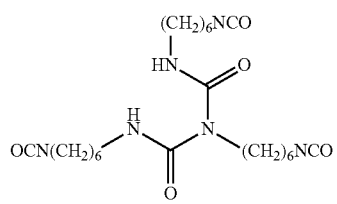

or the biuret of IPDI may be used.

The trifunctional isocyanate is reacted with an acrylate compound comprising isocyanate-reactive functional groups, in order to obtain a polyurethane acrylate compound. According to the present invention, the respective methacrylate compounds can also be used, although these are less preferred.

According to the present invention, preferably hydroxy-functional acrylate compounds may be used where the hydroxy group is present in the alcoholic portion of the acrylate. Such esters are commercially available and/or can be readily synthesized, for example from acrylic acid and a respective diol or hydroxy-functional epoxide. Commercially available esters include the hydroxyalkyl acrylates or hydroxyalkyl methacrylates wherein the alkyl group contains 2 to 10 carbon atoms, preferably 2 to 4 carbon atoms. The hydroxyalkyl acrylates and methacrylates have the following formula:

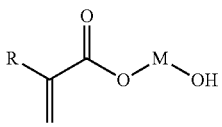

wherein R is hydrogen or methyl and M is a linear or a branched alkylene group having 2 to 10 carbon atoms, preferably 2 to 4 carbon atoms. Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

According to the present invention, particularly preferred hydroxy-functional acrylates are the reaction products of a hydroxy-functional acrylate as described above with a lactone. This results in acrylate-lactone adducts of the following formula

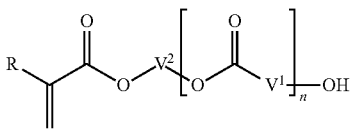

wherein R is as described above, V1 may be a straight or branched chain alkylene group having 3 to 8 carbon atoms which may be substituted with one or more alkyl groups having 1 to 12 carbon atoms, and V2 is a linear or a branched alkylene group having 2 to 10 carbon atoms, preferably 2 to 4 carbon atoms. Preferred adducts are derived from ε-caprolactones. n may be an integer from 1 to 5.

Those acrylate-lactone adducts are commercially available or can be easily synthesized by general known methods. For example, such adducts can be prepared by reacting a lactone with a hydroxyalkyl acrylate in the presence of a catalyst, for example an organometallic compound such as stannic chloride, at about 100° C. The reaction is generally carried out in the presence of oxygen and a suitable inhibitor to inhibit polymerization of the hydroxyalkyl acrylate. A suitable inhibitor is the monomethyl ether of hydroquinone.

According to the present invention, preferred hydroxy-functional acrylate compounds are the following commercially available materials: Bisomer Pemcure 12A (a caprolactone modified hydroxyethyl acrylate from Cognis), Sartomer SR 495B (a caprolactone acrylate from Cray-Valley/Total), Tone M100 (hydroxyacrylate modified with a caprolactone dimer from Dow), or Bisomer PPA6 (acrylic acid modified with a hexamer of methyl oxirane from Cognis).

The formation of a urethane-acrylate compound from the above starting materials can be carried out by reactions generally known to the skilled man. Usually, the starting materials are added together into a reaction flask, a catalyst such as dibutyl tin dilaurate, bismuth carboxylate or a zirconium chelate is added and the reaction mixture is heated to about 45 to 85° C., preferably 65 to 75° C., for a time sufficient for the reaction to take place, for example from 15 minutes to 3 hours. Depending on the starting materials, the exothermic reaction that occurs in the mixture is so pronounced that the temperature should be kept under a certain limit, for example under 70° C. Also preferably, the reaction is carried out in the presence of oxygen (e.g. air) so as to prevent a polymerization reaction involving the acrylate moieties. According to a preferred embodiment, an air flow of around 150 ml/min is used. Details concerning this reaction may be found in e.g. WO 2006/085937, U.S. Pat. No. 5,703,141, GB-2,280,905, or U.S. Pat. No. 6,465,539, the respective content thereof being incorporated herewith by reference.

According to the present invention, it is important that not all free isocyanate groups react with the isocyanate-reactive acrylate. Thus, the stoichiometric ratio between the trifunctional isocyanate and the isocyanate-reactive acrylate is chosen such that at most 2 of the 3 free isocyanate groups are converted into urethane moieties. While it is preferred that 2 free isocyanate groups react in this process step, for certain purposes it may also be advantageous to select a stoichiometry resulting in the conversion of only one isocyanate group in this process step.

The urethane-acrylate compound is then reacted with a compound component selected from the group consisting of a $C_{12}$-$C_{22}$ carboxylic acid having one isocyanate-reactive group or a $C_{12}$-$C_{22}$ fatty alcohol. Preferably, it is a compound comprising at least one acid group and one isocyanate-reactive group. In said process step, the remaining free isocyanate groups are converted into urethane moieties.

The isocyanate-reactive group is preferably a hydroxy or an amino group or an epoxy group, most preferably a hydroxy group. Illustrative examples of the hydroxyl-functional compounds comprising a single acid group are monomers such as 12-hydroxy stearic acid, hydroxy myristic acid, hydroxy palmitic acid, etc. Also unsaturated $C_{12-22}$ compounds such as hydroxy ricinic acid may be used. Such compounds are commercially available or can be easily synthesized by standard methods.

Alternatively, the urethane-acrylate compound may also be reacted with a $C_{12}$-$C_{22}$ fatty alcohol such as stearyl alcohol. According to the present invention, a fatty alcohol is understood to be an alcohol which can be obtained from a fatty acid by reduction of the carboxylic group of the fatty acid to a hydroxy group. Thus, according to the present invention only monoalcohols are comprised by the term fatty alcohol. Polyols such as diols are not covered. This is important for viscosity control, since the use of polyfunctional compounds would bear the risk of an unwanted chain extension and thus an unwanted increase of the molecular weight of the product.

The fatty alcohol to be used in the present invention is a linear saturated or unsaturated primary alcohol having 12 to 22 carbon atoms, preferably 12 to 18 carbon atoms.

Also the conditions under which this process step is carried out are well-known to the skilled man. These conditions resemble more or less the conditions of the above first process step. Thus, the urethane acrylate compound obtained in the first step is mixed with the isocyanate-reactive carboxylic compound or the fatty alcohol under heating at about 40 to 90° C. for about 15 minutes to 3 h in the presence of a catalyst such as dibutyl tin dilaurate or a zirconium chelate, and preferably also in the presence of oxygen.

The stoichiometric ratio of the urethane-acrylate obtained from the first step and the isocyanate-reactive carboxylic compound or the fatty alcohol is chosen such that all the remaining free isocyanate groups react in this step. A complete conversion of all free isocyanate groups is to be obtained, although it is well known to the skilled man that usually a very slight amount of free isocyanate groups still may be present at the end of the reaction. According to the present invention, a complete conversion of all free isocyanate groups is deemed to have occurred if the final product does not exhibit more than 0.2% remaining free NCO groups.

Moreover, according to the present invention it is preferred to choose such a stoichiometric ratio of the starting materials that the final reaction product exhibits an acid value of between 10 to 50 mg/KOH, preferably of 10 to 30 mg/KOH, and most preferably of 15 to 25 mg/KOH.

According to the present invention, it is preferred to carry out the above described two reaction steps in a one-pot reaction. This means, as is well-known, that both reaction steps are carried out in the same reaction vessel without any intermediate purification or separation step.

According the a preferred embodiment of the present invention, the reaction product thus obtained has the formula (I)

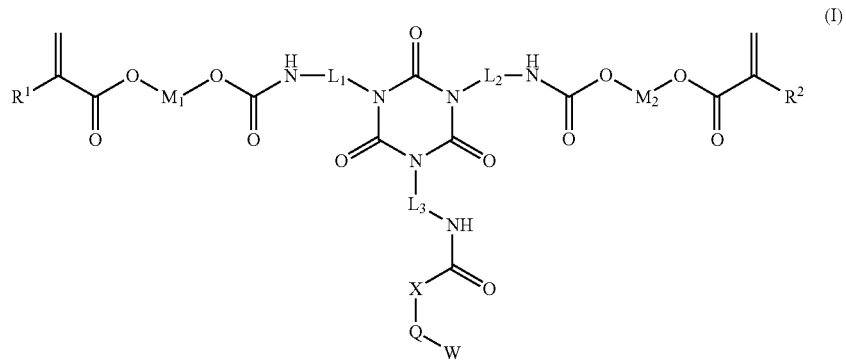

wherein
$L_1$, $L_2$, and $L_3$ are the same or different and denote a linear or branched aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or a straight-chain or branched araliphatic hydrocarbon residue having 7 to 20 carbon atoms;
$R^1$ and $R^2$ are the same or different and denote H or $CH_3$;
$M_1$ and $M_2$ are the same or different and denote a linear or branched alkylene group having 2 to 10 carbon atoms, or a moiety

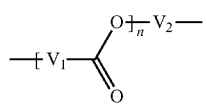

i. wherein
ii. V1 is a straight or branched chain alkylene group having 3 to 8 carbon atoms which may be substituted with one or more alkyl groups having 1 to 12 carbon atoms,
iii. V2 is a linear or a branched alkylene group having 2 to 10 carbon atoms, preferably 2 to 4 carbon atoms, and
iv. n is an integer from 1 to 5
X is N or O
Q a linear or branched aliphatic hydrocarbon residue having 12 to 22 carbon atoms, a cycloaliphatic hydrocarbon residue having 12 to 15 carbon atoms, an aromatic hydrocarbon residue having 12 to 15 carbon atoms or a straight-chain or branched araliphatic hydrocarbon residue having 12 to 22 carbon atoms; and
W is COOH or H.

According to an even more preferred embodiment of the present invention, the reaction product thus obtained has the above formula (I), wherein
L1, L2, and L3 are the same or different and denote

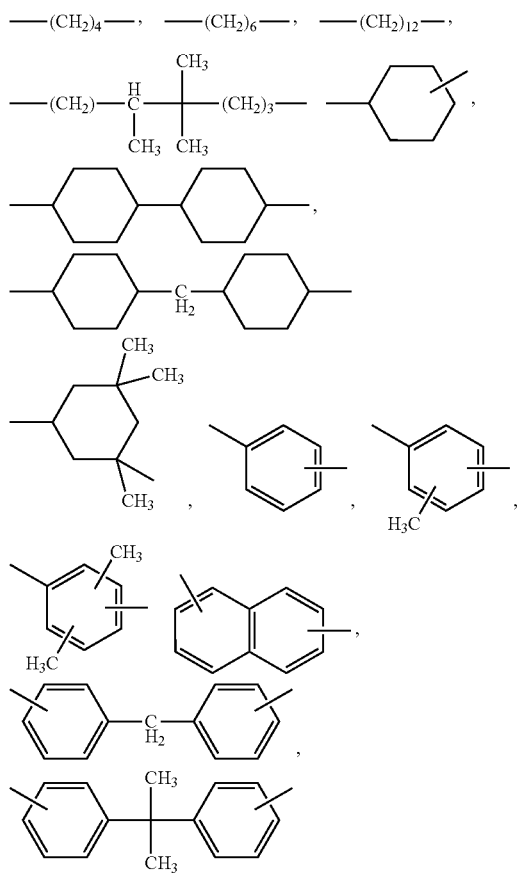

$R^1$ and $R^2$ are the same or different and denote H or CH$_3$;

M1 and M2 are the same or different and denote

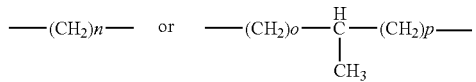

wherein
n is an integer from 2 to 10,
o and p are independently an integer from 0 to 9, wherein o+p≤9 or a moiety

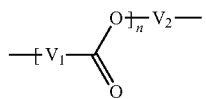

wherein
V1 is a straight or branched chain alkylene group having 3 to 6 carbon atoms which may be substituted with one or more alkyl groups having 1 to 6 carbon atoms,
V2 is a linear or a branched alkylene group having 2 to 4 carbon atoms, and
n is an integer from 1 to 3
X is N or O
Q is a linear or branched aliphatic hydrocarbon residue having 12 to 22 carbon atoms; and
W is COOH or H.

According to an even more preferred embodiment of the present invention, the reaction product thus obtained has the above formula (I), wherein
L1, L2, and L3 are the same or different and denote

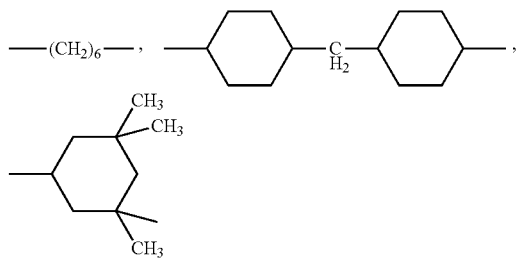

$R^1$ and $R^2$ are the same or different and denote H;
M1 and M2 are the same and denote a moiety

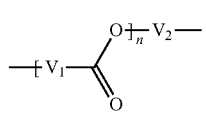

wherein
V1 is a straight or branched chain alkylene group having 3 to 6 carbon atoms which may be substituted with one or more alkyl groups having 1 to 6 carbon atoms,
V2 is a linear or a branched alkylene group having 2 to 4 carbon atoms, and
n is an integer from 1 to 3
X is O
Q is a linear or branched aliphatic hydrocarbon residue having 12 to 22 carbon atoms; and
W is COOH or H.

According to an especially preferred embodiment of the present invention, the reaction product thus obtained has the above formula (I), wherein L1, L2 and L3 are the same and denote hexamethylene;
R1 and R2 are the same and denote H
M1 and M2 are the same and denote a moiety

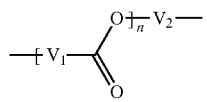

wherein
V1 is $(CH_2)_5$;
V2 is $CH_2CH_2$, and
n is 1;
X is O
Q-W is $CH_3$—$(CH_2)_6$—CH—$(CH_2)_9$—COOH.

According to another especially preferred embodiment of the present invention, the reaction product thus obtained has the above formula (I), wherein
L1, L2 and L3 are the same and denote hexamethylene;
R1 and R2 are the same and denote H
M1 and M2 are the same and denote a moiety

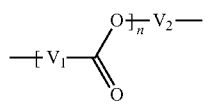

wherein
V1 is $(CH_2)_5$;
V2 is $CH_2CH_2$, and
n is 1;
X is O
Q-W is —$(CH_2)_{17}$—$CH_2$—H.

Moreover, the present invention is related to a process of preparing a radiation curable binder as described above, comprising the steps of
a. reacting a polyisocyanate having 3 free isocyanate moieties with an acrylate having isocyanate-reactive groups in such a stoichiometric ratio that at most 2 of the 3 free isocyanate groups of said polyisocyanate are reacted; and
b. reacting the product obtained in step a) with a component selected from the group consisting of a $C_{12}$-$C_{22}$ carboxylic acid having one isocyanate-reactive group or a $C_{12}$-$C_{22}$ fatty alcohol, so that no free isocyanate moieties are left.

According to a preferred embodiment, in step a) of said process the ratio of said polyisocyanate to said acrylate are chosen such that 2 of the 3 free isocyanate groups of said polyisocyanate are reacted.

According to an even more preferred embodiment of the present invention, steps a) and b) are carried out in a one-pot reaction.

According to a most preferred embodiment of the present invention, the stoichiometric ratio of said polyisocyanate, said acrylate and said carboxylic acid are chosen such that the final reaction product exhibits an acid value of between 10 to 50 mg/KOH, preferably of 10 to 30 mg/KOH, and most preferably of 15 to 25 mg/KOH.

The final product has a viscosity of 90 to 850 Poise at 25° C.

The above reaction product of a polyisocyanate, isocyanate-functional acrylate and isocyanate-functional carboxylic acid or fatty alcohol is a suitable radiation curable binder for radiation curable printing inks. Today, the predominant radiation curable inks are UV-curable inks. Electron beams as radiation source are, however, playing an increasing role in today's printing technology. On the one hand, there are comparably high costs for the equipment necessary for electron beam curing, as well as due to safety concerns caused by the relatively high energy of the electrons. On the other hand, electron beam curing provides for a very deep and complete curing of a printing ink and is thus the method of choice for certain specific printing processes.

UV-curable inks and electron-beam curable inks closely resemble each other with respect to their composition. The major difference is that in electron beam curable inks no photoinitiator has to be present. This leads to a reduction of odour problems.

Thus, radiation curable inks of the present invention comprise at least one pigment, an ink vehicle (binder), at least one solvent and optionally additives. In the case of UC curable inks, as already mentioned, one of the additives has to be a photoinitiator.

The printing inks of the present invention are characterized in that they comprise as a binder component the above described reaction product of a polyisocyanate, isocyanate-functional acrylate and isocyanate-functional carboxylic acid or fatty alcohol is a suitable radiation curable binder. According to the present invention, the printing ink comprises 20 to 80% by weight, preferably 20 to 60% by weight of the total ink of said binder component.

Solvents are used in printing inks for adjusting the viscosity of the ink to the respective printing technique to be carried out, for dissolving certain inks components, as well as for pigment wetting. In radiation curable inks, the solvent is predominantly a reactive diluent which takes part in the radiation-initiated polymerization reaction of the binder and is incorporated into the resulting polymer matrix of the printed ink layer. Preferably, the reactive diluents used in the inks of the present invention are acrylate monomers or oligomers, preferably monomers, which copolymerize with the binder component during printing of the printed ink layer. Such acrylate compounds are well-known to the skilled man. As examples, the following compounds may be mentioned: monofunctional monomers such as isodecyl acrylate (IDA) or phenoxy ethyl acrylate (PEEA); difunctional acrylates such as 1,4-butanediol diacrylate (BDDA), 1,6-hexanediol diacrylate (HDDA), Diethyleneglycol diacrylate (DEGDA), Polyethyleneglycol diacrylate (PEGDA), or Bisphenol A diacrylate (ABPE2); trifunctional acrylates such as Pentaerythritol triacrylate (PETA), Trimethylol propane triacrylate (TMPTA) or derivatives thereof; or polyfunctional acrylates such as Dipentaerythritol hexaacrylate (DPHA) or propoxylated pentaerythritol tetraacrylate (PPTTA). According to the present invention, the printing ink comprises 10 to 80% by weight, preferably 20 to 60% by weight of the total ink of said reactive diluent(s).

As far as the pigment component is concerned, conventional pigments used in radiation curable printing inks may also be used in the inks of the present invention. Examples of suitable pigments are phthalocyanine Blue (CI Pigment Blue 15:3), Pigment red 146, Pigment red 122, CI pigment red 57.1, carbon black (CI pigment black 7), or CI pigment white 8. According to the present invention, the printing ink comprises 10 to 50% by weight, preferably 10 to 30% by weight of the total ink of said at least one pigment.

Photoinitiators capable of initiating the polymerization reaction evoked by UV curing are well-known to the skilled man. For example, benzophenone and derivatives therefrom, Acetophenone and derivatives therefrom, benzoine and derivatives therefrom, or thioxanthones and derivatives therefrom may be mentioned as photoinitiators useful for the purposes of the present invention. Commercially available photoinitiators useful for the present invention are, for example, Irgacure 819 or polymeric photoinitiators such as polymeric ITX or polymeric EDB. According to the present invention, the UV curable printing ink comprises 0.1 to 20% by weight, preferably 1 to 10% by weight of the total ink of said photoinitiator. As mentioned above, electron beam curing inks do not require the presence of a photoinitiator.

Photosynergists such as amine derivatives may be optionally present in the UV curing inks of the present invention.

Additives suitable for the printing inks of the present invention involve commonly known additives of radiation curable inks, such as waxes, stabilizers, fillers etc. These are well-known to the skilled man and need not be discussed in further detail here.

The various printing techniques are of course well-known and need not be discussed here. The present invention is about offset or letterpress printing. Also the equipment for the subsequent UV or electron radiation curing is well-known and does not be described in detail here.

The present invention will now be explained in more detail with reference to non-limiting examples.

EXAMPLE 1

A five-necked flask equipped with two addition funnels, a gas introduction means, an agitator and a thermometer, was charged with a mixture of 35.30 wt.-% Tolonate HDT-LV 2 (an isocyanurate trimer of HDI) and a stabilizer (Floristic UV-1, from Kormaed), at an agitation speed of 60 rpm and an air flow of 0.009 m³/h. The temperature was increased to 45° C., and then 55.80 wt.-% Pemcure 12-A (a caprolactone-modified hydroxyethyl acrylate) and a catalyst was added. The temperature was then further increased to 75° C. The obtained intermediate was further reacted with 8.90 wt.-% 12-hydroxy stearic acid over 3 to 6 hours to yield a polyurethane acrylate modified with hydroxy stearic acid. Said binder had an acid number of 15.4 mg KOH/g.

The polyurethane acrylate modified with hydroxy stearic acid was used as a binder in an amount of 33.00 wt. % in an ink composition. Said ink composition additionally comprised 31.00 wt.-% epoxy acrylate, 18.00 wt.-% of a blue pigment, as well as additives such as stabilizer, monomer or filler. Said ink composition had a viscosity of 190 Poises/25° C.

EXAMPLE 2

A five-necked flask equipped with two addition funnels, a gas introduction means, an agitator and a thermometer, was charged with a mixture of 35.50 wt.-% Tolonate HDT-LV 2 (an isocyanurate trimer of HDI) and a stabilizer (Florstab UV-1, from Kromaken), at an agitation speed of 60 rpm and an air flow of 0.009 m³/h. The temperature was increased to 45° C., and then 55.20 wt.-% Pemcure 12-A (a caprolactone-modified hydroxyethyl acrylate) and a catalyst was added. The temperature was then further increased to 75° C. The obtained intermediate was further reacted with 9.30 wt.-% stearyl alcohol (Kalcol 8098 from Kao Chemicals) to yield a polyurethane acrylate modified with stearyl alcohol.

The polyurethane acrylate modified with stearyl alcohol was used as a binder in an amount of 33.00 wt. % in an ink composition. Said ink composition additionally comprised 30.00 wt.-% epoxy acrylate, 18.00 wt.-% of a blue pigment, as well as additives such as stabilizer, monomer (alkoxylated pentaerythritol tetraacrylate (PPTTA), from Cognis) or filler. Said ink composition had a viscosity of 200 Poises/25° C.

Results

Brightness measurements were performed according to standard methods with a glossometer (Byk Gardner microtrigloss) at an angle of 60°.

The brightness of a print obtained with the ink composition of example 1 or 2 was compared with the brightness of a print obtained with ink compositions comprising conventional (unmodified) polyurethane acrylates (Genomer 4312 from Rahn (comparative example 1); and Pro20069 from Cray-Valley (comparative example 2)). The results were as follows:

| Ink composition | Brightness (%) |
|---|---|
| Example 1 | 27.40 |
| Example 2 | 26.10 |
| Comparative example 1 | 20.40 |
| Comparative example 2 | 23.70 |

It can be seen that the ink compositions comprising the modified polyurethane acrylates according to the present invention show improved gloss properties.

The invention claimed is:

1. A radiation curable binder, comprising the reaction product of a polyisocyanate having 3 free isocyanate moieties with an acrylate having isocyanate-reactive groups and a component selected from the group consisting of a $C_{12}$-$C_{22}$ carboxylic acid having one isocyanate-reactive group, wherein said reaction product has the formula (I)

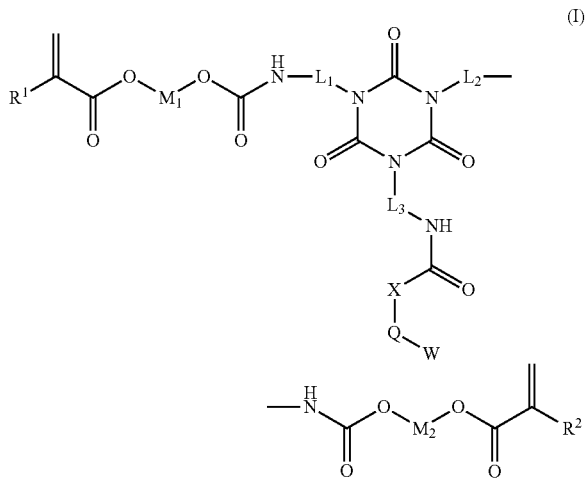

wherein
$L_1$, $L_2$, and $L_3$ are the same or different and denote a linear or branched aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or a straight-chain or branched araliphatic hydrocarbon residue having 7 to 20 carbon atoms;

$R^1$ and $R^2$ are the same or different and denote H or $CH_3$;

$M_1$ and $M_2$ are the same or different and denote a linear or branched alkylene group having 2 to 10 carbon atoms, or a moiety

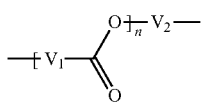

wherein $V_1$ is a straight or branched chain alkylene group having 3 to 8 carbon atoms which may be substituted with one or more alkyl groups having 1 to 12 carbon atoms, $V_2$ is a linear or a branched alkylene group having 2 to 10 carbon atoms, preferably 2 to 4 carbon atoms, and n is an integer from 1 to 5

X is N or O

Q a linear or branched aliphatic hydrocarbon residue having 12 to 22 carbon atoms, a cycloaliphatic hydrocarbon residue having 12 to 15 carbon atoms, an aromatic hydrocarbon residue having 12 to 15 carbon atoms or a straight-chain or branched araliphatic hydrocarbon residue having 12 to 22 carbon atoms; and W is COOH.

2. Binder according to claim 1, wherein

L1, L2, and L3 are the same or different and denote

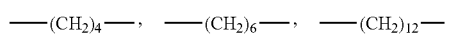

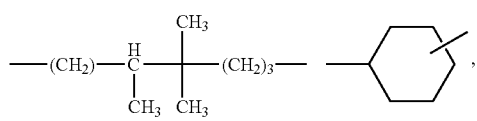

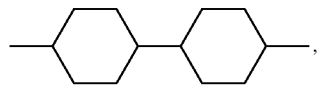

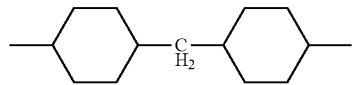

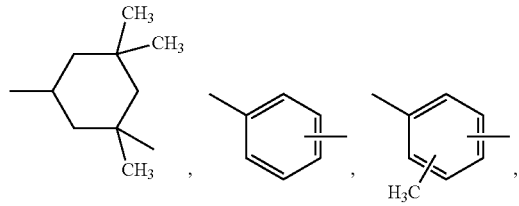

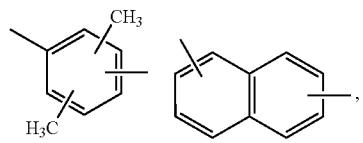

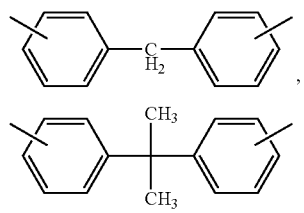

$R^1$ and $R^2$ are the same or different and denote H or $CH_3$;

M1 and M2 are the same or different and denote

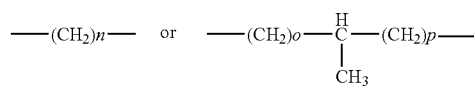

wherein n is an integer from 2 to 10, o and p are independently an integer from 0 to 9, wherein o+p≤9 or a moiety

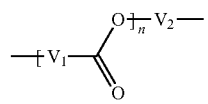

wherein

V1 is a straight or branched chain alkylene group having 3 to 6 carbon atoms which may be substituted with one or more alkyl groups having 1 to 6 carbon atoms, V2 is a linear or a branched alkylene group having 2 to 4 carbon atoms, and n is an integer from 1 to 3

X is N or O

Q is a linear or branched aliphatic hydrocarbon residue having 12 to 22 carbon atoms; and W is COOH.

3. Binder according to claim 1, wherein

L1, L2, and L3 are the same or different and denote

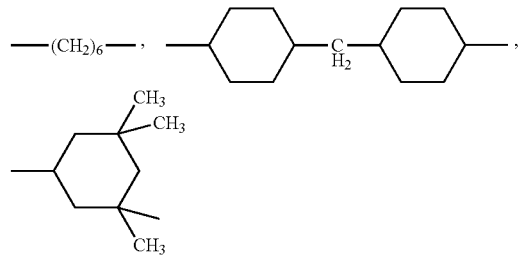

$R^1$ and $R^2$ are the same or different and denote H;

M1 and M2 are the same and denote a moiety

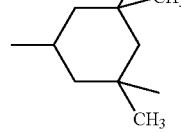

wherein

V1 is a straight or branched chain alkylene group having 3 to 6 carbon atoms which may be substituted with one or more alkyl groups having 1 to 6 carbon atoms, V2 is a linear or a branched alkylene group having 2 to 4 carbon atoms, and n is an integer from 1 to 3

X is N or O

Q is a linear or branched aliphatic hydrocarbon residue having 12 to 22 carbon atoms;

and W is COOH.

4. Binder according to claim 1, wherein
L1, L2 and L3 are the same and denote hexamethylene;
R1 and R2 are the same and denote H
M1 and M2 are the same and denote a moiety
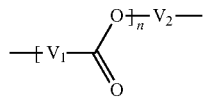
wherein
V1 is $(CH_2)_5$;
V2 is $CH_2C_2$, and
n is 1; and
X is or O
Q-W is $CH_3$—$(CH_2)_6$—CH—$(CH_2)_9$–COOH.
* * * * *